(No Model.) 2 Sheets—Sheet 1.
W. F. HUBBARD.
COMBINED SOD CUTTER, SEEDER, AND HARROW.
No. 307,949. Patented Nov. 11, 1884.
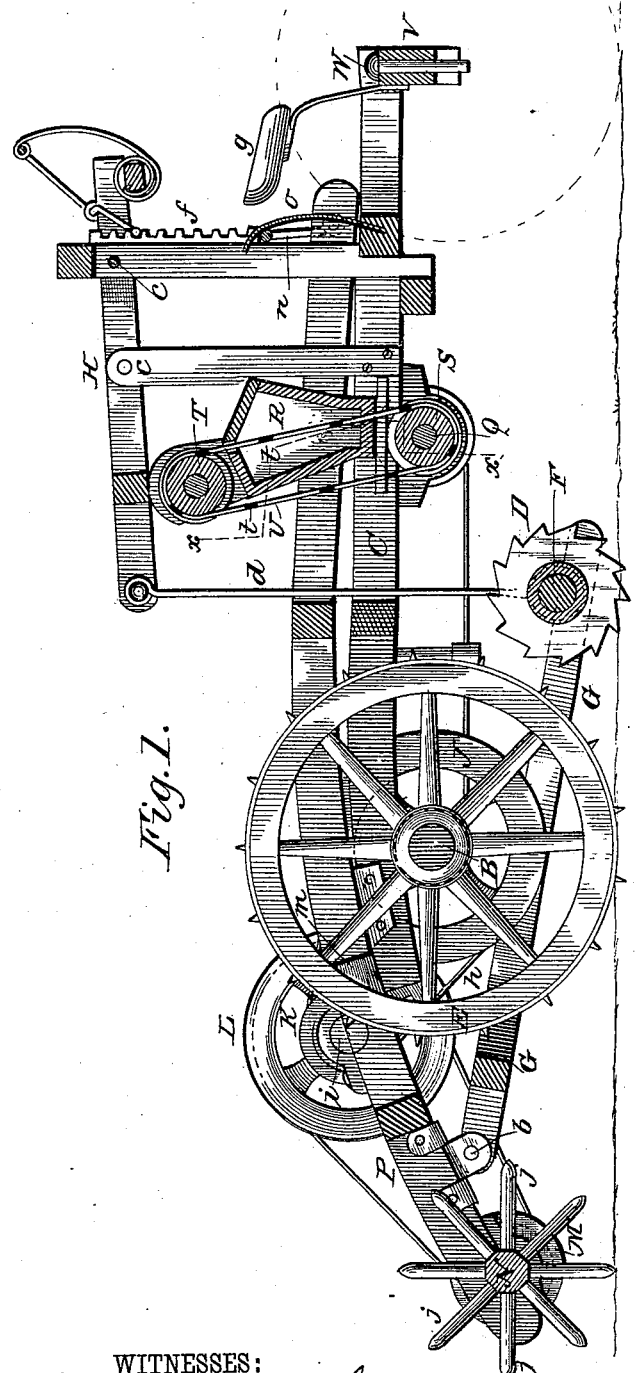
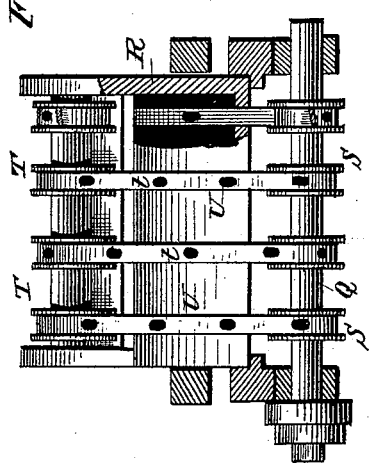
WITNESSES:
Fred G. Dieterich
W. X. Stevens
INVENTOR:
Wm F. Hubbard
BY Munn & Co
ATTORNEYS.

(No Model.)　　　　　　　　　　　　　2 Sheets—Sheet 2.
W. F. HUBBARD.
COMBINED SOD CUTTER, SEEDER, AND HARROW.
No. 307,949.　　　　　　　　Patented Nov. 11, 1884.
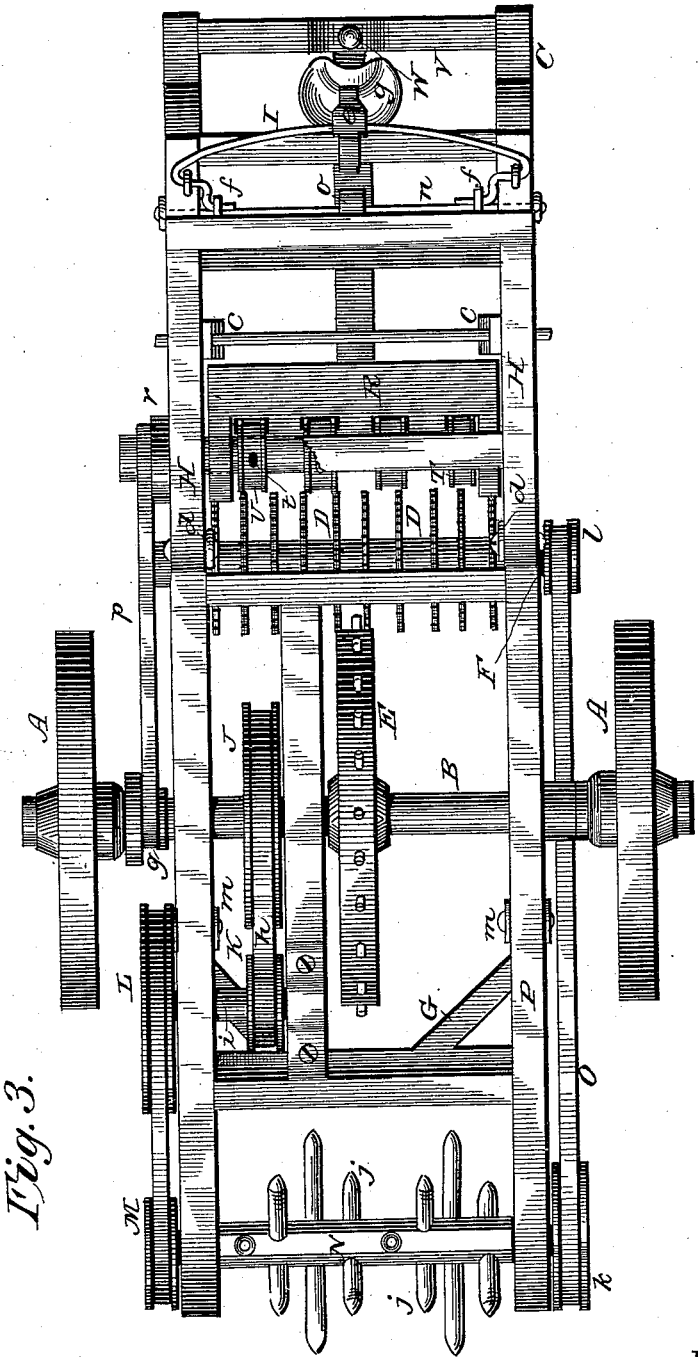
WITNESSES:　　　　　　　　　　　　INVENTOR:
Fred. G. Dieterich　　　　　　　Wm. F. Hubbard
W. C. Stevens.　　　　　　　　　BY Munn & Co.
　　　　　　　　　　　　　　　　ATTORNEYS.

UNITED STATES PATENT OFFICE.

WILLIAM F. HUBBARD, OF WALLA WALLA, WASHINGTON TERRITORY.

COMBINED SOD-CUTTER, SEEDER, AND HARROW.

SPECIFICATION forming part of Letters Patent No. 307,949, dated November 11, 1884.

Application filed February 18, 1884. (No model.)

*To all whom it may concern:*

Be it known that I, WILLIAM F. HUBBARD, a citizen of the United States, residing at Walla Walla, in the county of Walla Walla, Washington Territory, have invented certain new and useful Improvements in Combined Sod-Cutter, Seeder, and Revolving Harrow, of which the following is a description.

This invention relates to that class of machines which are mounted on wheels to be drawn over the field by a team guided by a rider, to pulverize hard soil, and at the same time to drop and cover seed therein.

To this end my invention consists in the construction and combination of parts forming a combined sod-cutter, seeder, and revolving harrow, hereinafter described and claimed, reference being had to the accompanying drawings, in which—

Figure 1 is a longitudinal vertical section showing my invention. Fig. 2 is a transverse vertical section at $x$ $x$ of Fig. 1, and Fig. 3 is a plan view of the whole machine.

A represents a pair of common wagon-wheels, journaled to turn freely on a shaft, B, upon which the main frame C of the machine is mounted.

E is the drive-wheel, firmly secured on shaft B, and provided with teeth to engage the ground, to insure its revolving to drive all the machinery by advancing on the ground.

D represents a series of deep-toothed circular saws removably fixed upon a shaft, F, to revolve therewith. This shaft F is journaled in a frame, G, which is pivoted to the hollow frame P at $b$, to swing down and up to allow the saws to bury more or less into the ground.

H is a frame hung at $c$ in posts of the main frame, and connected by rods $d$ with the saw-frame G.

I is a lever-latch hung to frame H, and provided with a spring, $e$, to cause it to engage notches $f$ on the main frame. The driver sitting in the seat $g$ may raise or lower frame H, and thereby raise or lower the saws and fix them to run at the required depth, by securing the latch I in one of the notches $f$.

J is a pulley secured on the main shaft B, and connected by a chain belt, $h$, with a small pulley, K, on an intermediate shaft, $i$, to revolve the latter.

L is a large pulley on the intermediate shaft, $i$, connecting with a pulley, M, on the harrow-shaft N, to revolve it. This shaft is provided with steel teeth $j$, each fastened in with a separate set-screw, so that it may be removed at will. The teeth in shaft N form a double spiral around it, like the twist of an auger-blade. The teeth $j$ stand in longitudinal planes between the saws D, in order that they may tear up and pulverize the strips of earth between the saw-kerfs. By being placed spirally about the shaft N the teeth $j$ scatter the earth somewhat laterally to the path of the machine, thereby evenly spreading and covering the grain which is dropped ahead of the saws.

O is a belt connecting the pulley $k$ on the harrow-shaft and the pulley $l$ on the saw-shaft, whereby the latter is revolved at a much greater speed than they would revolve by rolling on the ground. The harrow-shaft N is journaled in a frame, P, which is pivoted to the main frame at $m$, to be elevated and depressed by means of a handle-latch, $n$, which is forced to engage the rack of teeth or notches $f$ by a spring, $o$. By supporting the saw-frame by the rods $d$ near the saw-arbor D, the saws will remain at any height at which they have been secured, whether the rear end of their frame G be raised or lowered with the hollow frame P. The saw-frame being pivoted at $b$ near the axis of its drive-pulley $k$, its belt will remain at the same tension whether the saws be elevated or depressed.

Q is a shaft journaled in the main frame below the seed-box R, to be rotated by a belt, $p$, running over a pulley, $q$, on the main shaft B, and a pulley, $r$, on the said shaft Q.

S represents a series of flanged pulleys fixed on shaft Q, and T a similar series on a shaft, $s$, above the seed-box R.

U represents a series of belts running over the pulleys S and T and passing down through the seed-box, in the bottom of which are apertures fitting the belts. Each belt U is perforated with a series of holes, $t$, into which kernels of grain enter, and when the belt passes through the bottom of the seed-box it carries out these kernels and drops them; but the belts fit the apertures in the bottom of the box too closely to permit grain to pass out otherwise. The number of belts may be regulated to the desired width between the rows of seed planted, and by using different belts the size and number of holes in the belt may be regulated to deliver at each drop the amount required and to make the drops along the rows at any desired distance apart.

For straddle-row cultivating, a portion of the saws and of the harrow-teeth may be removed. The forward end of the frame C is provided with a bolster, V, and king-bolt W, suitable to connect with any fore wheels in use on the farm, so that the farmer may save this expense in buying my combined sod-cutter, seeder, and harrow; yet for those who wish to pay for a complete and independent machine such fore wheels will be made for it.

The main shaft may be revolved by the supporting-wheels A in the manner common to some styles of mowing-machines, and a separate drive-wheel, E, be dispensed with; but I prefer its use, as hereinbefore described.

By the use of this machine sodded land and hard-baked land may be readily pulverized to a condition suitable to receive seed, and the seed may be at the same time planted.

What I claim as my invention, and desire to secure by Letters Patent, is—

1. The combination, with the frame C, the shaft B, journaled to revolve therein, and the wheels A, journaled to revolve on the said shaft, of the wheel E, firmly fixed centrally on the shaft, having pins in its circumference to engage the ground, the pulley J, fixed on the shaft, the harrow N j and means connecting it with the shaft B, to be revolved thereby, a series of saws, D, mounted on an arbor provided with a pulley, l, journaled in a frame, G, pivoted to the harrow-frame P, and means connecting the pulley l with the harrow to be revolved thereby, substantially as shown and described.

2. The combination, with the main frame C and the harrow hung thereto, as described, of the circular saws D, the frame G, carrying said saws and pivoted to the harrow-frame at b, the frame H, the pivots c, the rods d, the lever-latch I, the spring e, and notches f, as shown and described.

3. The combination, with a frame, C, mounted on wheels, and carrying a series of circular saws and a revolving harrow, of a seed-box, R, a series of perforated belts, U, the series of pulleys S and T, and means to revolve said belts by the main drive-wheel of the machine, substantially as shown and described.

WILLIAM F. HUBBARD.

Witnesses:
W. X. STEVENS,
SOLON C. KEMON.